(12) United States Patent
Mindler et al.

(10) Patent No.: US 11,190,448 B2
(45) Date of Patent: Nov. 30, 2021

(54) TRANSPORT CONGESTION CONTROL OPTIMIZATION BASED ON NETWORK CONTEXT

(71) Applicant: Verizon Patent and Licensing Inc., Arlington, VA (US)

(72) Inventors: Daniel Mindler, Somerset, NJ (US); Hugo David Munoz Sanchez, Hillsborough, NJ (US); Maria Cel Halili Zaballero, Ramsey, NJ (US); Daniel Osorio, Hackensack, NJ (US); Xihong Wang, Morris Plains, NJ (US); Lixia Yan, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 66 days.

(21) Appl. No.: 16/696,017

(22) Filed: Nov. 26, 2019

(65) Prior Publication Data

US 2021/0160183 A1    May 27, 2021

(51) Int. Cl.
*H04W 28/02*    (2009.01)
*H04L 12/801*   (2013.01)
*H04W 72/04*    (2009.01)
*H04L 12/26*    (2006.01)
*H04L 12/24*    (2006.01)

(52) U.S. Cl.
CPC .......... *H04L 47/12* (2013.01); *H04L 41/5067* (2013.01); *H04L 43/08* (2013.01); *H04W 72/0406* (2013.01)

(58) Field of Classification Search
None
See application file for complete search history.

(56) References Cited

U.S. PATENT DOCUMENTS

| | | | | |
|---|---|---|---|---|
| 10,419,354 B2* | 9/2019 | Li | .......................... | H04L 47/27 |
| 10,492,097 B2* | 11/2019 | Lee | ....................... | H04L 47/283 |
| 10,523,547 B2* | 12/2019 | Juneja | ..................... | H04L 43/10 |
| 10,623,980 B1* | 4/2020 | Patel | ...................... | H04L 69/163 |
| 2016/0381614 A1* | 12/2016 | Kotecha | .................. | H04L 47/27 |
| | | | | 370/334 |
| 2017/0070438 A1* | 3/2017 | Lee | ....................... | H04W 48/16 |
| 2017/0126547 A1* | 5/2017 | Wood | .................... | H04L 45/304 |
| 2017/0126574 A1* | 5/2017 | Goel | ................... | H04L 43/0882 |
| 2017/0339711 A1* | 11/2017 | Belghoul | .......... | H04W 72/0446 |
| 2018/0091999 A1* | 3/2018 | Zhang | ............... | H04W 28/0289 |
| 2018/0159778 A1* | 6/2018 | Lee | ....................... | H04L 47/193 |
| 2020/0162962 A1* | 5/2020 | Li | ..................... | H04W 28/0289 |

* cited by examiner

*Primary Examiner* — Sithu Ko

(57) ABSTRACT

A network device transmits data to a user equipment (UE) via a first Radio Access Network (RAN) using first Transmission Control Protocol (TCP) congestion control parameters. The network device receives a notification message indicating that the UE has moved from the first RAN to a second RAN, and modifies, responsive to receipt of the notification, the first TCP congestion control parameters to create second TCP congestion control parameters. The network device transmits data to the UE via the second RAN using the second TCP congestion control parameters.

14 Claims, 11 Drawing Sheets

TRANSPORT CONGESTION CONTROL OPTIMIZATION BASED ON NETWORK CONTEXT

BACKGROUND

Congestion control is typically used within a network to manage network traffic and prevent overloading of limited network resources, such as, for example, bandwidth. The "pipes" used to transport data traffic may vary in size from the data source (e.g., a server in a data center) to a destination (e.g., a user equipment) across the Internet through various routers and gateways. If the data source sends too much data at once, the destination can be overloaded by the excessive data, and the "pipe" between the source and the destination may become congested, slowing the delivery of data packets and contributing to packet loss. The transport protocol (e.g., Transmission Control Protocol (TCP)) may attempt to re-deliver unacknowledged packets which, in turn, may cause even more congestion on the "pipe" between the source and the destination.

To ensure a transport endpoint does not get overwhelmed by the amount of data being delivered, window sizes for receiving packets are shared between transport endpoints (i.e., between source and destination). When a session is established, each endpoint advertises to the other how many packets it can handle. Acknowledgements are sent by the receiving destination device for each packet received. As network usage has dramatically increased over time, the number of data sessions and associated amount of data has grown as well. This growth in data volume has led, even with the use of advertised window sizes, to network congestion that negatively impacts network performance. To control this network congestion, TCP introduced congestion and avoidance algorithms to remedy these problems. These congestion and avoidance algorithms are built into the endpoints of a data session in the network and enable the endpoints during the session to react to conditions and slow down or speed up the sending of TCP data packets.

DETAILED DESCRIPTION OF THE PREFERRED EMBODIMENTS

Figure 1A:
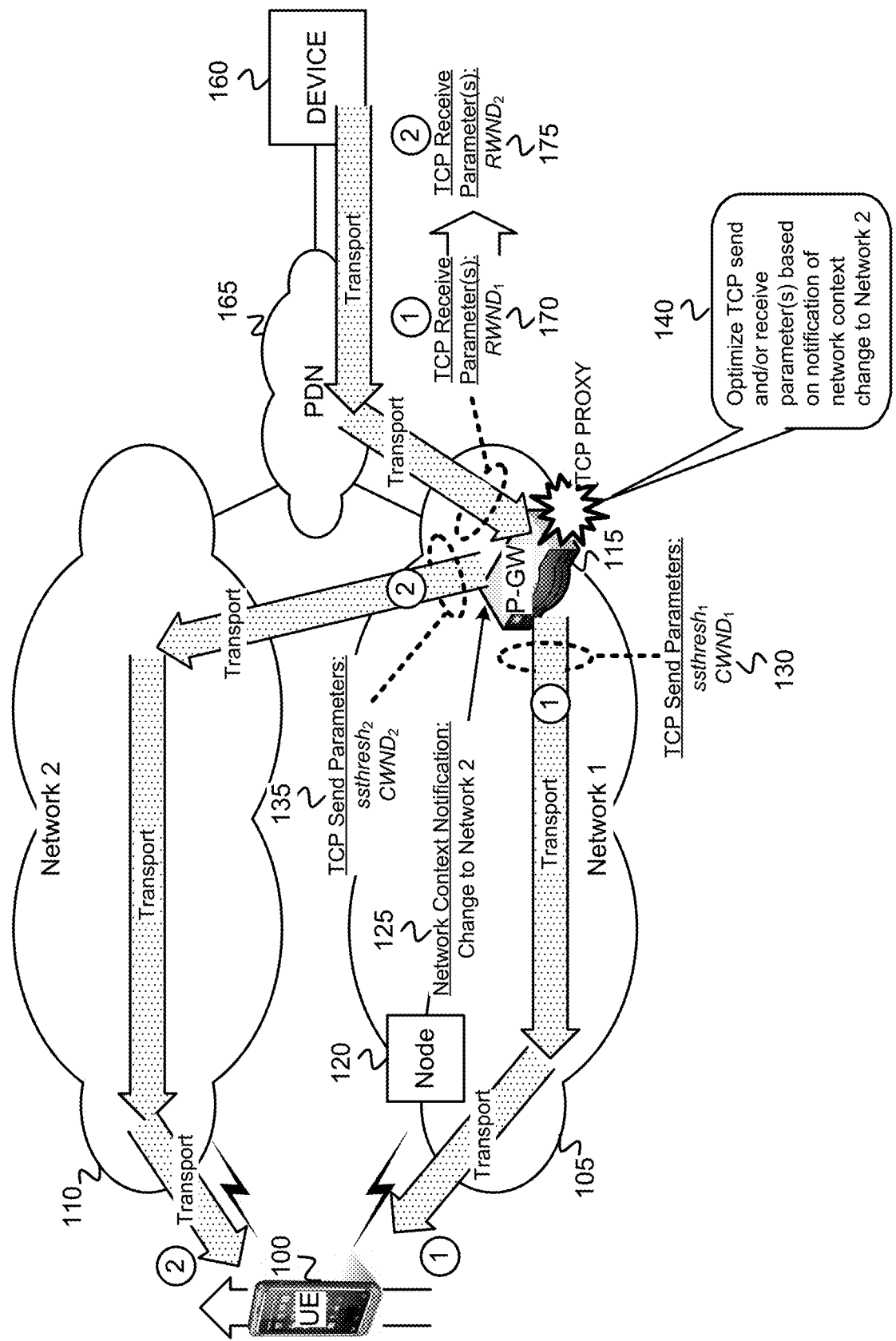
FIGS. 1A and 1B illustrate an overview of the optimization of transport congestion control parameters, associated with data transport to a user equipment, based on changes in network context within a dual network environment.

The following detailed description refers to the accompanying drawings. The same reference numbers in different drawings may identify the same or similar elements. The following detailed description does not limit the invention.

Next Generation mobile networks have been proposed as the next evolution of mobile wireless networks, such as the existing Fourth Generation (4G) and 4.5G Long Term Evolution (LTE) mobile networks. Next Generation mobile networks, such as Fifth Generation (5G) New Radio (NR) mobile networks, may operate in the higher frequency ranges (e.g., in the Gigahertz frequency band) with a broad bandwidth of about 500-1,000 Megahertz. The expected bandwidth of Next Generation mobile networks is intended to support higher speed downloads. The proposed 5G mobile telecommunications standard may operate in the millimeter wave bands (e.g., 14 Gigahertz (GHz) and higher), and may support more reliable, massive machine communications (e.g., machine-to-machine (M2M), Internet of Things (IoT)). Next Generation mobile networks, such as those implementing the 5G mobile telecommunications standard, are expected to enable a higher utilization capacity than current wireless systems, permitting a greater density of wireless users. Next Generation mobile networks are also expected to increase data transfer rates, increase spectral efficiency, improve coverage, and reduce latency.

The goal for TCP congestion control algorithms is to deliver data packets at the highest speeds possible based on observed network conditions. TCP congestion control algorithms dynamically adjust data transmission based on successful delivery of data across a given "pipe." These algorithms increase the rate of data transmission based on current network conditions and current observed link capacity. Successful operation of TCP congestion control algorithms involves a delicate balance of being aggressive enough to quickly increase the number of packets being sent, but also identify when link capacity has been reached. Existing TCP congestion control algorithms determine when link capacity has been reached by measuring a round trip time (RTT), and a number of dropped packets/timeouts. RTT includes a measure of how long it takes from when a packet is sent from a source until a packet acknowledgement is received by the source from the destination. Dropped packets and timeouts occur when a packet acknowledgement is not received by the source from a destination in response to the source sending the packet to the destination. The source will attempt to re-send unacknowledged packets thereby causing an increased usage of link capacity.

A variety of different TCP congestion control algorithms have been developed over time. Most of these algorithms have a pre-defined approach for adapting to sending TCP packets based on observable metrics associated with the TCP stream. Such algorithms work sufficiently well in most network environments, but may not perform well in a dual network environment that includes both a 4G Radio Access Network (RAN) and a Next Generation RAN (e.g., a 5G RAN) and when user equipment transits back and forth between the 4G RAN and the Next Generation RAN. A Next Generation RAN, such as a 5G RAN, will have greater bandwidth capacity but typically a significantly smaller physical coverage area than a 4G RAN. Non-stationary UEs moving between the 4G RAN and Next Generation RAN coverage areas will likely change back and forth between the 4G and Next Generation RANs frequently, resulting in large changes in available bandwidth to the UEs. Existing TCP congestion control algorithms, which were primary developed for endpoints with constant bandwidth, or relatively limited changes in bandwidth, do not perform well when encountering the drastic changes in available bandwidth that occur when UEs move back and forth between 4G RANs and Next Generation RANs. Therefore, TCP congestion control mechanisms are needed that can quickly adapt to the large changes in available bandwidth that can occur in a dual 4G/Next Generation mobile network environment.

Exemplary embodiments described herein leverage knowledge of the serving RAN (e.g., 4G or 5G) to optimize the parameters of TCP congestion control. In some implementations, an identification of a change in network context, such as from a 4G RAN to a 5G RAN (or vice versa), results in immediate modification to the congestion window size (CWND) of the TCP congestion control algorithm. CWND specifies the amount of data that the sender can send into the serving RAN before receiving an acknowledgement from the receiver. In further implementations, an identification of the change in network context (e.g., from 4G RAN to 5G RAN, or vice versa) results in immediate modification to the slow start threshold (ssthresh) that controls a period over which the sender increases or decreases the rate of the transmission of data of a data stream so as to quickly reach an upper bandwidth limit associated with the transport link.

In the exemplary embodiments described herein, optimization of the TCP congestion control parameters may be triggered by notification of a change in network context when the UE moves from the coverage area of a 4G RAN to the coverage area of a 5G RAN, or vice versa. Optimization of the TCP congestion control parameters based on a network context change enables the TCP congestion control algorithm to pro-actively and aggressively ramp up data transmission to take advantage of the increased bandwidth of a 5G RAN when a UE moves from a 4G RAN to the 5G RAN, and to more effectively slow down the data transmission rate to deal with the decreased bandwidth when the UE moves from a 5G RAN to a 4G RAN. Knowledge of the performance characteristics associated with the networks involved in a change of network context (e.g., from network coverage area 1 to network coverage area 2) may, thus, be used to pro-actively optimize TCP congestion control parameters to speed up, or slow down, the data transmission rate. Knowledge of the performance characteristics associated with networks involved in a UE's change in network context may further include movement of a UE between urban and rural network coverage areas (i.e., network coverage in the urban area designed for high usage compared to network coverage in the rural area designed for low usage), and movement of a UE between geographic areas having network coverage areas with greatly varying performance characteristics (e.g., from a concert arena having a coverage area designed for high usage to a park having a coverage area designed for low usage). The knowledge of the network performance characteristics may include other types of knowledge, such as, for example, the UE's distance from a cell tower (close vs. far) as the UE moves from a first network coverage area to a second network coverage area.

As described herein, a TCP proxy may be established at, for example, a network gateway or router, that "splits" a TCP connection associated with a data session between a first device (e.g., a server) and a second device (e.g., a UE), into two: a first TCP connection between the first device and the gateway/router, and a second TCP connection between the gateway/router and the second device. The TCP proxy at the gateway/router may, in some implementations, optimize one or more TCP parameters associated with sending data, originating with the first device, to the second device from the gateway/router across the second TCP connection based on a change in network context associated with movement of the second device. In these implementations, the TCP proxy at the gateway/router may modify the congestion window (CWND) and/or the slow start threshold (ssthresh) parameters associated with sending the data from the TCP proxy at the gateway/router to the second device (e.g., the UE) based on knowledge of the respective performance characteristics of the network coverage area from which the second device is moving (i.e., network coverage area 1) and the performance characteristics of the network coverage area into which the second device is moving (i.e., network coverage area 2).

Additionally, or alternatively, the TCP proxy at the gateway/router may, in other implementations, optimize one or more TCP parameters associated with sending data from the first device to the gateway/router. In these implementations, the TCP proxy at the gateway/router may modify the receive window (RWND) that the gateway/router advertises to the first device, to control the rate of data transmitted from the first device to the gateway/router, based also on the knowledge of the respective performance characteristics of the network coverage area from which the second device is moving (i.e., network coverage area 1) and the performance characteristics of the network coverage area into which the second device is moving (i.e., network coverage area 2).

Figure 1B:
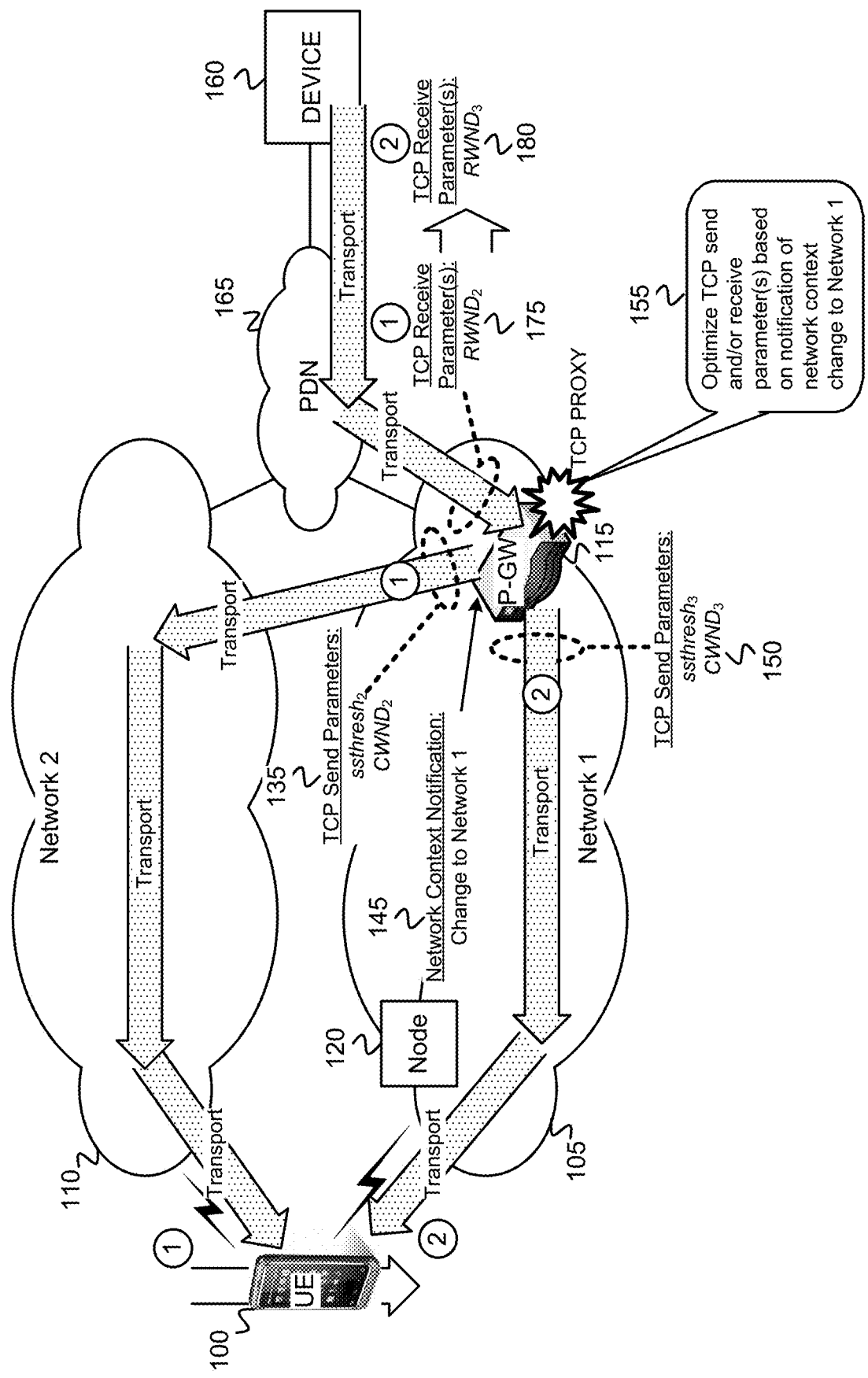

FIGS. 1A and 1B illustrate an overview of the optimization of transport congestion control parameters, associated with data transport to a UE 100, based on changes in network context within a dual network environment. FIG. 1A depicts a UE 100 transiting from a first network 105 (identified with a "1" within a circle) to a second network 110 (identified with a "2" within a circle). A data stream, originating with a source device 160, may transit a Packet Data Network (PDN) 165 to a packet gateway (P-GW) 115 at which a TCP proxy is implemented. P-GW 115 transports the packets of the data stream (also identified with a "1" within a circle) to UE 100 via network 105 while UE 100 is located within a coverage area of network 105. During transport of the data stream from P-GW 115 to UE 100 via first network 105, P-GW 115 may implement a TCP congestion control algorithm using a first set of TCP congestion control send parameters 130. The first set of TCP congestion control send parameters 130 may control transmission of packets of the data stream between P-GW 115 and UE 100 across network 105. In one implementation, the TCP send parameters 130 may include a first $CWND_1$ and/or a first slow start threshold ($ssthresh_1$) that are each optimized for known network performance characteristics of the first network 105. In one circumstance, first network 105 may include a 4G mobile network, and second network 110 may include a Next Generation mobile network (or at least the RAN of a Next Generation mobile network), such as a 5G mobile network.

Additionally, or alternatively, during transport of the data stream from device 160 to P-GW 115 (and on to UE 100 via network 105), P-GW 115 may advertise a TCP receive parameter(s) 170 to device 160 which device 160 can use to control the rate of packet transmission on the data stream from device 160 to P-GW 115. In one implementation, the TCP receive parameter(s) 170 may include a receive window size ($RWND_1$) that specifies an amount of data that device 160 can send to P-GW 115 without receiving an acknowledgement from P-GW 115.

As UE 100 transits from first network 105 to second network 110, a node 120 within first network 105 identifies the change in network context and sends a message 125 to notify P-GW 115 of the UE 100's change from the first network 105 to the second network 110. The notification message 125 may additionally include an identifier (ID) of the second network 110 (or a RAN within the second network 110), and a transport layer address associated with the RAN of the second network 110. Upon receipt of notification message 125, P-GW 115 optimizes, at 140, TCP send and/or receive parameters associated with transport of the data stream from P-GW 115 to UE 100, and with transport of the data stream from device 160 to P-GW 115. In one implementation, optimizing the TCP send parameters may include modifying the first set of TCP congestion control send parameters 130 to generate an optimized second set of TCP congestion control send parameters 135. The second set of TCP congestion control send parameters 135 may include a second $CWND_2$ and/or a second slow start threshold ($ssthresh_2$) that are each optimized for known network performance characteristics of the second network 110. Optimization of the TCP congestion control parameters may, therefore, include modifying $ssthresh_1$ to a $ssthresh_2$, and/or $CWND_1$ to a $CWND_2$, to optimize each for the network characteristics (e.g., increased bandwidth) of the second network 110. Optimization of the TCP congestion control send parameters is described in further detail below with respect to FIG. 5. P-GW 115 then re-routes the transport stream to UE 100 via the second network 110 (shown with a "2" within a circle in FIG. 1A) using, for example, the transport layer address of network 110's RAN included in notification message 125, and sends the data of the stream using TCP congestion control and the optimized second set of TCP congestion control parameters 135.

Additionally, or alternatively, the TCP proxy at P-GW 115 may optimize the TCP receive parameter(s), based on receipt of the network context notification 125 from node 120, to control the transport of the data stream from device 160 to P-GW 115 (and on to UE 100 via network 110). P-GW 115 may advertise a TCP receive parameter(s) 175 to device 160 which device 160 can use to control the rate of packet transmission on the data stream from device 160 to P-GW 115. In one implementation, the TCP receive parameter(s) 175 may include a receive window size ($RWND_2$) that specifies an amount of data (that is different than specified by $RWND_1$) that device 160 can send to P-GW 115 without receiving an acknowledgement from P-GW 115. Optimization of the TCP congestion control receive parameter(s) 175 is described in further detail below with respect to FIG. 5.

FIG. 1B illustrates a UE 100 transiting from second network 110 (identified with a "1" within a circle) to first network 105 (identified with a "2" within a circle). In the circumstances of FIG. 1B, UE 100 moves from the second network 110 back into the first network 105 that the UE 100 previously was located within (as described with respect to FIG. 1A). A data stream, originating with source device 160, may transit a PDN 165 to P-GW 115 at which the TCP proxy is implemented. P-GW 115 transports the packets of the data stream (also identified with a "1" within a circle) to UE 100 via network 110 while UE 100 is located within a coverage area of network 110. During transport of the data stream from P-GW 115 to UE 100 via second network 110, P-GW 115 may implement a TCP congestion control algorithm using the second set of TCP congestion control send parameters 135. The second set of TCP congestion control parameters 135 may include a second $CWND_2$ and/or a second slow start threshold ($ssthresh_2$) that were each optimized for known network performance characteristics of the second network 110, as described with respect to FIG. 1A above. Additionally, or alternatively, during transport of the data stream from source device 160 to P-GW 115 and on to UE 100 via network 110, device 160 may implement a TCP congestion control algorithm using the second TCP receive parameter(s) 175 (e.g., $RWND_2$) previously received from the TCP proxy at P-GW 115, as described above with respect to FIG. 1A.

As UE 100 transits from second network 110 to first network 105, node 120 within first network 105 identifies the change in network context and sends a message 145 to notify P-GW 115 of the UE 100's change from second network 110 to the first network 105 into which the UE 100 is transiting. The notification message 125 may additionally include an identifier (ID) of the first network 105 (or an ID of the RAN of network 105), and a transport layer address associated with the RAN of the first network 105. Upon receipt of notification message 145, optimizes, at 155, TCP send and/or receive parameters associated with transport of the data stream from P-GW 115 to UE 100, and with transport of the data stream from device 160 to P-GW 115. In one implementation, optimizing the TCP send parameters may include modifying the second set of TCP congestion control send parameters 135 to generate an optimized third set of TCP congestion control send parameters 150. The third set of TCP congestion control send parameters 150 may include a third $CWND_3$ and/or a third slow start threshold ($ssthresh_3$) that are each optimized for current, known network performance characteristics of the first network 105. Optimization of the TCP congestion control send parameters may, therefore, include modifying $ssthresh_2$ to a $ssthresh_3$, and/or $CWND_2$ to a $CWND_3$, to optimize each parameter for the network characteristics (e.g., decreased bandwidth) of the first network 105. Optimization of the TCP congestion control send parameters is described in further detail below with respect to FIG. 8. P-GW 115 then re-routes the transport stream to UE 100 via the first network 105 (shown with a "2" within a circle in FIG. 1B) using, for example, the transport layer address of network 105's RAN included in notification message 145, and sends the data of the stream using the optimized third set of TCP congestion control parameters 150.

Additionally, or alternatively, the TCP proxy at P-GW 115 may optimize the TCP receive parameter(s), based on receipt of the network context notification 145 from node 120, to control the transport of the data stream from device 160 to P-GW 115 (and on to UE 100 via network 105). P-GW 115 may advertise a TCP receive parameter(s) 180 to device 160 which device 160 can use to control the rate of packet transmission on the data stream from device 160 to P-GW 115. In one implementation, the TCP receive parameter(s) 180 may include a receive window size ($RWND_3$) that specifies an amount of data (that is different than specified by $RWND_2$) that device 160 can send to P-GW 115 without receiving an acknowledgement from P-GW 115. Optimization of the TCP congestion control receive parameter(s) 180 is described in further detail below with respect to FIG. 8.

Figure 2:
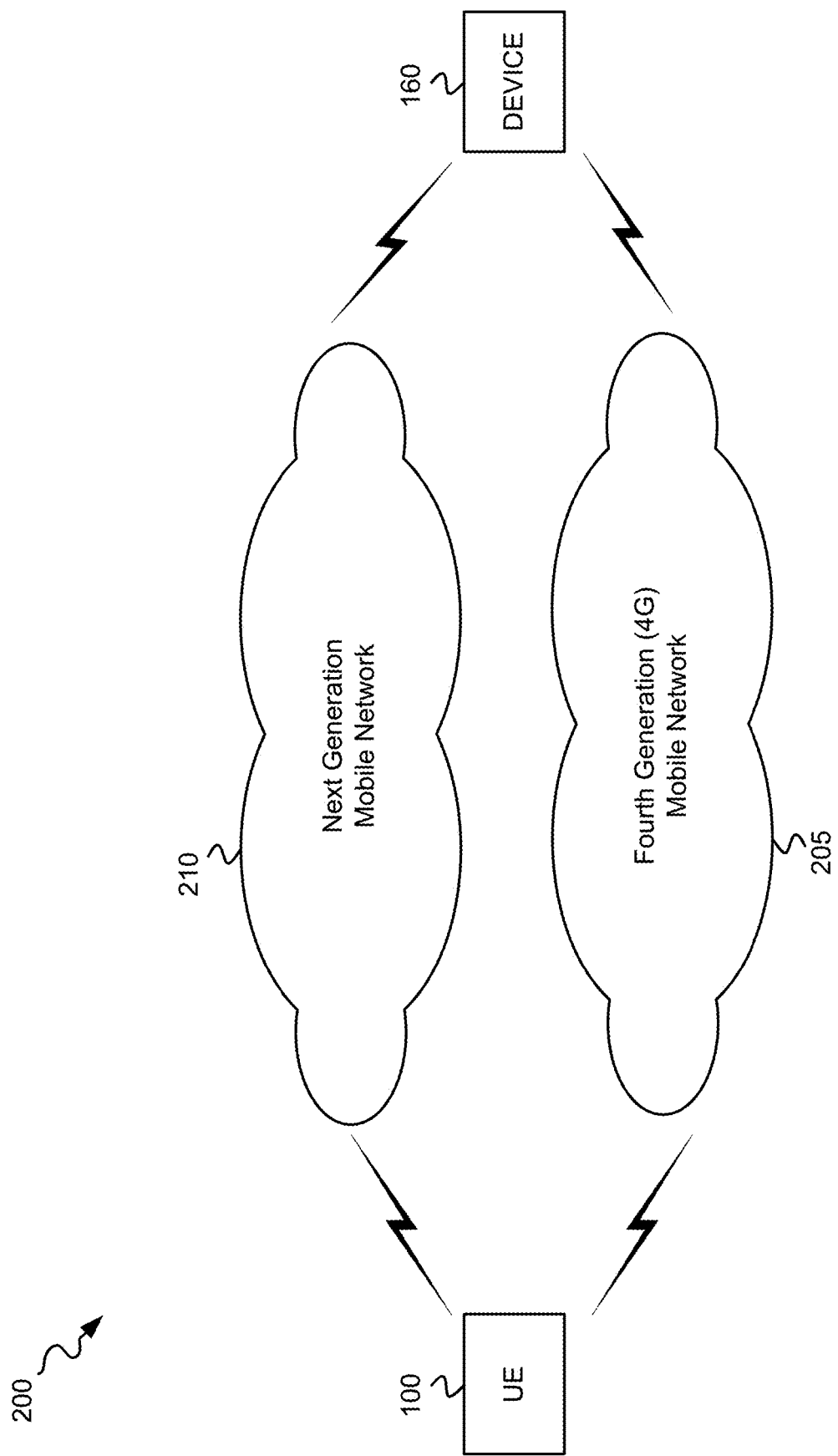
FIG. 2 illustrates an exemplary dual network environment in which transport congestion control parameters may be optimized based on network context changes associated with user equipment moving from a first network to a second network.

FIG. 2 illustrates an exemplary dual network environment 200 in which transport congestion control parameters may be optimized based on network context changes associated with UEs 100 moving from a first network to a second network (and vice versa). As shown, network environment 200 may include a UE 100, a 4G mobile network 205, a Next Generation mobile network 210, and a device 160. Network environment 200 may additionally include PDN 165 (not shown) that interconnects network 205 and network 210. 4G mobile network 205 of FIG. 2 corresponds to the first network 105 of FIGS. 1A and 1B, and Next Generation mobile network 210 of FIG. 2 corresponds to the second network 110 of FIGS. 1A and 1B.

UE 100 may include any type of electronic device having a wireless network communication capability. In some embodiments, UE 100 may include a mobile wireless device. UE 100 may include, for example, a laptop, palmtop, desktop, or tablet computer; a personal digital assistant (PDA); a cellular phone (e.g., a "smart" phone); a Voice over Internet Protocol (VoIP) phone; a smart television (TV); an audio speaker (e.g., a "smart" speaker); a video gaming device; a music player (e.g., a digital audio player); a digital camera; or an Internet of Things (IoT) or Machine-to-Machine (M2M) device. A user (not shown) may carry, use, administer, and/or operate UE 100.

4G mobile network(s) 205 includes any type of a Public Land Mobile Network (PLMN) or satellite network that implements a Long-Term Evolution (LTE) mobile telecommunications standard, such as the 4G or 4.5G LTE standard. 4G network 205 may alternatively include any other type of PLMN or satellite network, including a non-LTE network.

Next Generation mobile network(s) 210 includes any type of a Next Generation Mobile network that includes evolved network components (e.g., future generation components) relative to an LTE network, such as a 4G or 4.5G mobile network. In one implementation, Next Generation Mobile network 210 may include a 5G mobile network.

Device 160 may include a server, another UE, or another type of network device that serves as a source of a data session sent to UE 100 via either Next Generation mobile network 210 or 4G mobile network 205. For example, device 160 may include a media server that sends streaming media to UE 100 via networks 210 or 205.

The configuration of network components of network environment 200 shown in FIG. 2 is for illustrative purposes. Other configurations may be implemented. Therefore, network environment 200 may include additional, fewer and/or different components that may be configured in a different arrangement than that depicted in FIG. 2. For example, though only a single UE 100 and a single device 160 are shown in FIG. 2, multiple different UEs 100 and multiple different devices 160 may connect, either directly or indirectly via a PDN 165, to 4G mobile network(s) 205 and/or Next Generation mobile network(s) 210.

Figure 3:
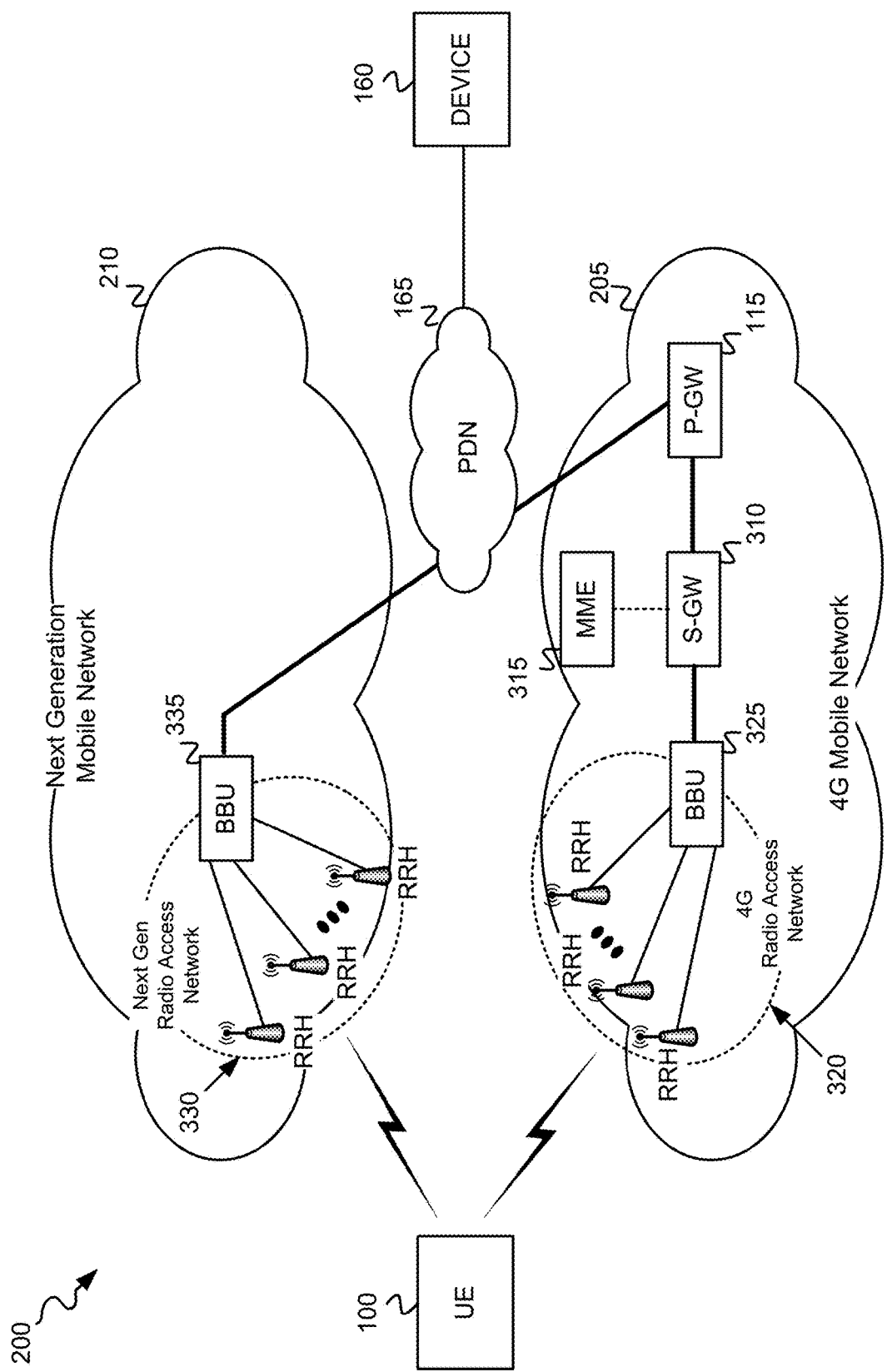
FIG. 3 depicts exemplary components of the Fourth Generation mobile network and the Next Generation mobile network of the network environment of FIG. 2.

FIG. 3 depicts exemplary components of 4G mobile network 205 and Next Generation mobile network 210 of the network environment 200 of FIG. 2. As shown, 4G mobile network(s) 205 may include, among other nodes, P-GW 115, a Serving Gateway node (S-GW) 310, a Mobility Management Entity (MME) 315, and an LTE RAN 320.

P-GW 115 includes a network device that acts as a router and a gateway between 4G Mobile Network 205 and a PDN 165, and forwards session data from 165 300 to a base band unit (BBU) 325 in 4G RAN 320, and forwards session data through PDN 165 to a BBU 335 in a Next Generation RAN 330 of Next Generation mobile network 210. S-GW 310 includes a network device that routes and forwards session data between P-GW 115 and a 4G RAN 320 serving the session's destination UE 100.

MME 315 includes a network device that acts as a control entity for 4G mobile network 205, including communicating with a Home Subscriber Server (HSS) (not shown) of 4G mobile network 205 for user/device authentication and for user/device profile download. MME 315 further provides UE 100 with mobility management and session management functions using, for example, Network Access Stratum (NAS) signaling. MME 315 may correspond, for example, to node 120 of FIGS. 1A and 1B.

4G RAN 320 may provide wireless network access to UE 100 and may include, among other components, a BBU 325 and multiple remote radio heads (RRHs). 4G RAN 320 may include one or more additional BBUs and RRHs, and other wireless nodes and components, not shown in FIG. 3. BBU 325 may connect to the multiple RRHs via, for example, optical fibers. BBU 325 includes a network device that operates as a digital function unit that transmits digital baseband signals to the multiple RRHs, and receives digital baseband signals from the multiple RRHs. If BBU 325 is connected to the multiple RRHs via, for example, optical fibers, then BBU 325 may convert the digital baseband signals into corresponding optical signals for transmission to the RRHs, and may receive optical signals from the RRHs and convert the optical signals into corresponding digital baseband signals.

The RRHs include network devices that operate as radio function units that transmit and receive radio frequency (RF) signals to/from UE 100. If the RRHs are connected to BBU 325 via an optical fiber, the RRHs may convert received RF signals to optical signals and transmit the optical signals to BBU 325. Additionally, the RRHs may receive optical signals from BBU 325 via the optic fiber, convert the optical signals to RF signals for transmission via one or more antennas (e.g., one or more antenna arrays) of the RRHs. Each of the RRHs may include at least one antenna array, transceiver circuitry, and other hardware and software components for enabling the RRHs to receive data via wireless RF signals from UE 100, and to transmit wireless RF signals to UE 100. BBU 325 and the associated RRH(s) represent a distributed evolved NodeB (eNB).

Next Generation mobile network 210 may provide wireless network access to UE 110 and may include, among other components, a Next Generation RAN 330. Next Generation RAN 330 may include a BBU 335 and multiple RRHs. BBU 335 may connect to the multiple RRHs via, for example, optical fibers. BBU 335 includes a network device that operates as a digital function unit that transmits digital baseband signals to the multiple RRHs, and receives digital baseband signals from the multiple RRHs. If BBU 335 is connected to the multiple RRHs via, for example, optical fibers, then BBU 335 may convert the digital baseband signals into corresponding optical signals for transmission to the RRHs, and may receive optical signals from the RRHs and convert the optical signals into corresponding digital baseband signals.

The RRHs include network devices that operate as radio function units that transmit and receive radio frequency (RF) signals to/from UE 100. If the RRHs are connected to BBU 335 via an optical fiber, the RRHs may convert received RF signals to optical signals, and transmit the optical signals to BBU 335. Additionally, the RRHs may receive optical signals from BBU 335 via the optic fiber, convert the optical signals to RF signals for transmission via one or more antennas (e.g., one or more antenna arrays) of the RRHs. Each of the RRHs may include at least one antenna array, transceiver circuitry, and other hardware and software components for enabling the RRHs to receive data via wireless RF signals from UE 100, and to transmit wireless RF signals to UE 100. If Next Generation Mobile network 210 is a 5G New Radio (NR) network, BBU 335 and the associated RRH(s) represent a distributed Next Generation NodeB, which may also be referred to as a "gNB," or may represent an enhanced LTE (eLTE) eNB that can connect to Next Generation Mobile network 210.

As shown, PDN 165 may interconnect 4G mobile network 205 and Next Generation mobile network 210. PDN 165 may include any type of packet-switching network(s) that can transport data between device 160 and UE 100. PDN 165 may include, for example, the Internet, a local area network(s) (LAN), a wide area network(s) (WAN), or a metropolitan area network (MAN). For purposes of simplicity, 4G RAN component terminology is used in FIG. 3 for describing components of both 4G RAN 320 and Next Generation RAN 330. Next Generation RAN 330, however, may, or may not, use the same components as 4G RAN 320 (e.g., RRH and/or BBU components). In some implementations, Next Generation RAN 330 may use components having a different nomenclature, and possibly performing different functions, than the components of 4G RAN 320 shown in FIG. 3. 4G mobile network 205 and Next Generation mobile network 210 are shown in FIG. 3 as connecting between P-GW 115 of 4G mobile network 205 and RAN 330 of Next Generation mobile network 210. However, in other implementations, P-GW 115 may interconnect with Next Generation mobile network 210 via other components of network 210 not shown in FIG. 3. For example, P-GW 115 may interconnect with network 210 via a User Plane Function (UPF) of network 210.

Figure 4:
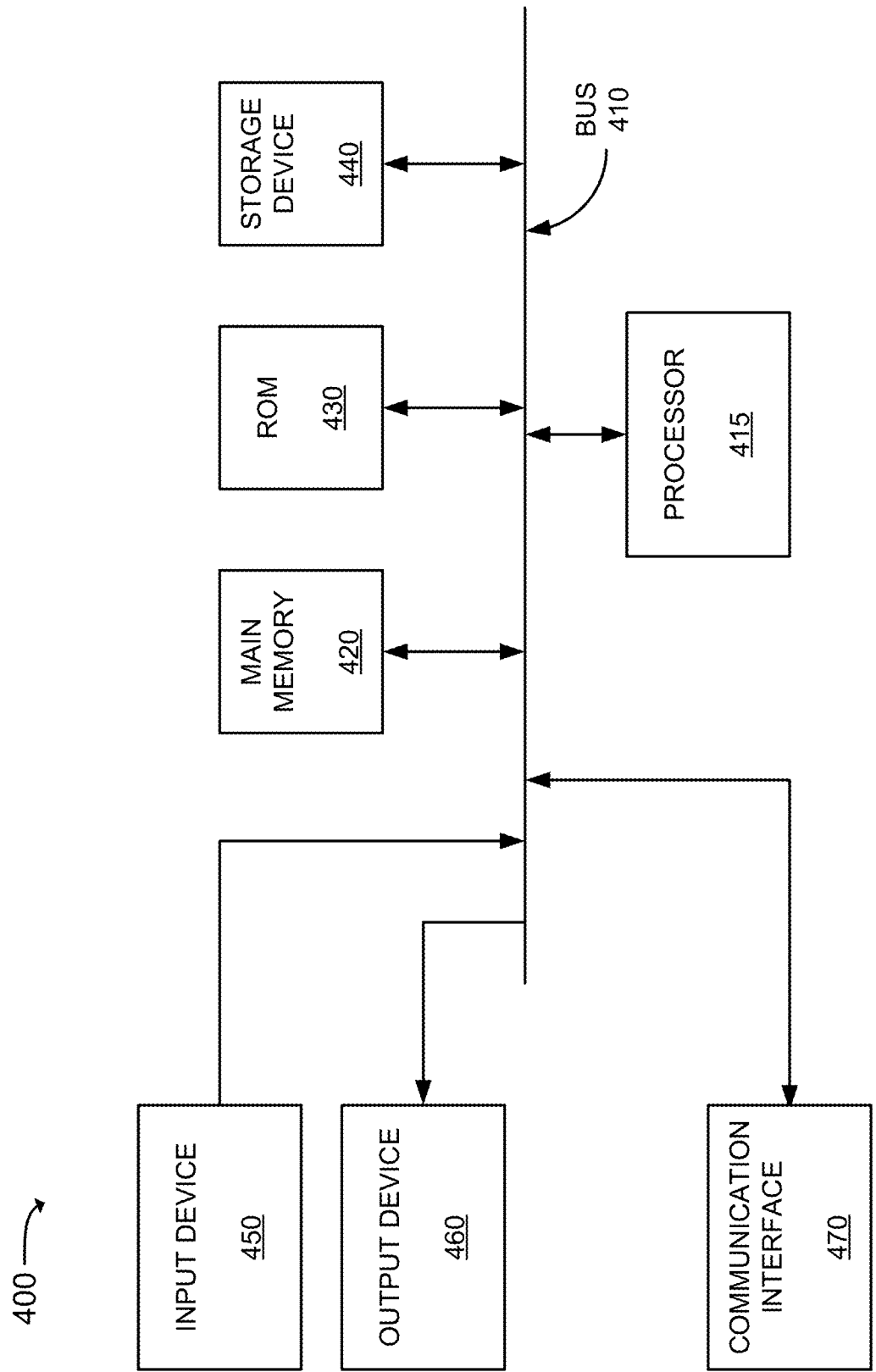
FIG. 4 is a diagram that depicts exemplary components of a device that may correspond to the user equipment, Packet Gateway, Mobility Management Entity, Base Band Units, and other devices of FIGS. 1A, 1B, 2, and 3.

FIG. 4 is a diagram that depicts exemplary components of a device 400. UE 100, node 120, P-GW 115, S-GW 310, MME 315, BBU 325, BBU 335, and device 160 may each include the same, or similar, components as device 400, and may be arranged in a same, or similar, configuration as the device 400. Device 400 may include a bus 410, a processor 415, a main memory 420, a read only memory (ROM) 430, a storage device 440, an input device 450, an output device 460, and a communication interface 470. Bus 410 may include a path that permits communication among the other components of device 400.

Processor 415 may include one or more processors or microprocessors which may interpret and execute stored instructions associated with one or more processes. Additionally, or alternatively, processor 415 may include processing logic that implements the one or more processes. For example, processor 415 may include, but is not limited to, programmable logic such as Field Programmable Gate Arrays (FPGAs) or accelerators. Processor 415 may include software, hardware, or a combination of software and hardware for executing the processes described herein.

Main memory 420 may include a random access memory (RAM) or another type of dynamic storage device that may store information and, in some implementations, instructions for execution by processor 415. ROM 430 may include a ROM device or another type of static storage device (e.g., Electrically Erasable Programmable ROM (EEPROM)) that may store static information and, in some implementations, instructions for use by processor 415. Storage device 440 may include a magnetic, optical, and/or solid state (e.g., flash drive) recording medium and its corresponding drive. Main memory 420, ROM 430 and storage device 440 may each be referred to herein as a "non-transitory computer-readable medium" or a "non-transitory storage medium." The processes/methods set forth herein can be implemented as instructions that are stored in main memory 420, ROM 430 and/or storage device 440 for execution by processor 415.

Input device 450 may include one or more devices that permit an operator to input information to device 400, such as, for example, a keypad or a keyboard, a display with a touch sensitive panel, voice recognition and/or biometric mechanisms, etc. Output device 460 may include one or more devices that output information to the operator, including a display, a speaker, etc. Input device 450 and output device 460 may, in some implementations, be implemented as a user interface (UI), such as a touch screen display, that displays UI information, and which receives user input via the UI. Communication interface 470 may include one or more transceivers that enable device 400 to communicate with other devices and/or systems. For example, communication interface 470 may include a wireless transceiver for communicating via a wireless link with LTE RAN 320 and/or Next Generation RAN 330. As another example, communication interface 470 may include a wired transceiver for communicating with PDN 165, or for communicating with other nodes within 4G mobile network 205 and/or Next Generation mobile network 210.

Device 400 may perform certain operations or processes, as may be described herein. Device 400 may perform these operations in response to processor 415 executing software instructions contained in a computer-readable medium, such as memory 430. A computer-readable medium may be defined as a physical or logical memory device. A logical memory device may include memory space within a single physical memory device or spread across multiple physical memory devices. The software instructions may be read into main memory 420 from another computer-readable medium, such as storage device 440, or from another device via communication interface 470. The software instructions contained in main memory 420 may cause processor 415 to perform the operations or processes, as described herein. Alternatively, hardwired circuitry (e.g., logic hardware) may be used in place of, or in combination with, software instructions to implement the operations or processes, as described herein. Thus, exemplary implementations are not limited to any specific combination of hardware circuitry and software.

The configuration of components of device 400 illustrated in FIG. 4 is for illustrative purposes only. Other configurations may be implemented. Therefore, device 400 may include additional, fewer and/or different components, arranged in a different configuration, than depicted in FIG. 4.

Figure 5:
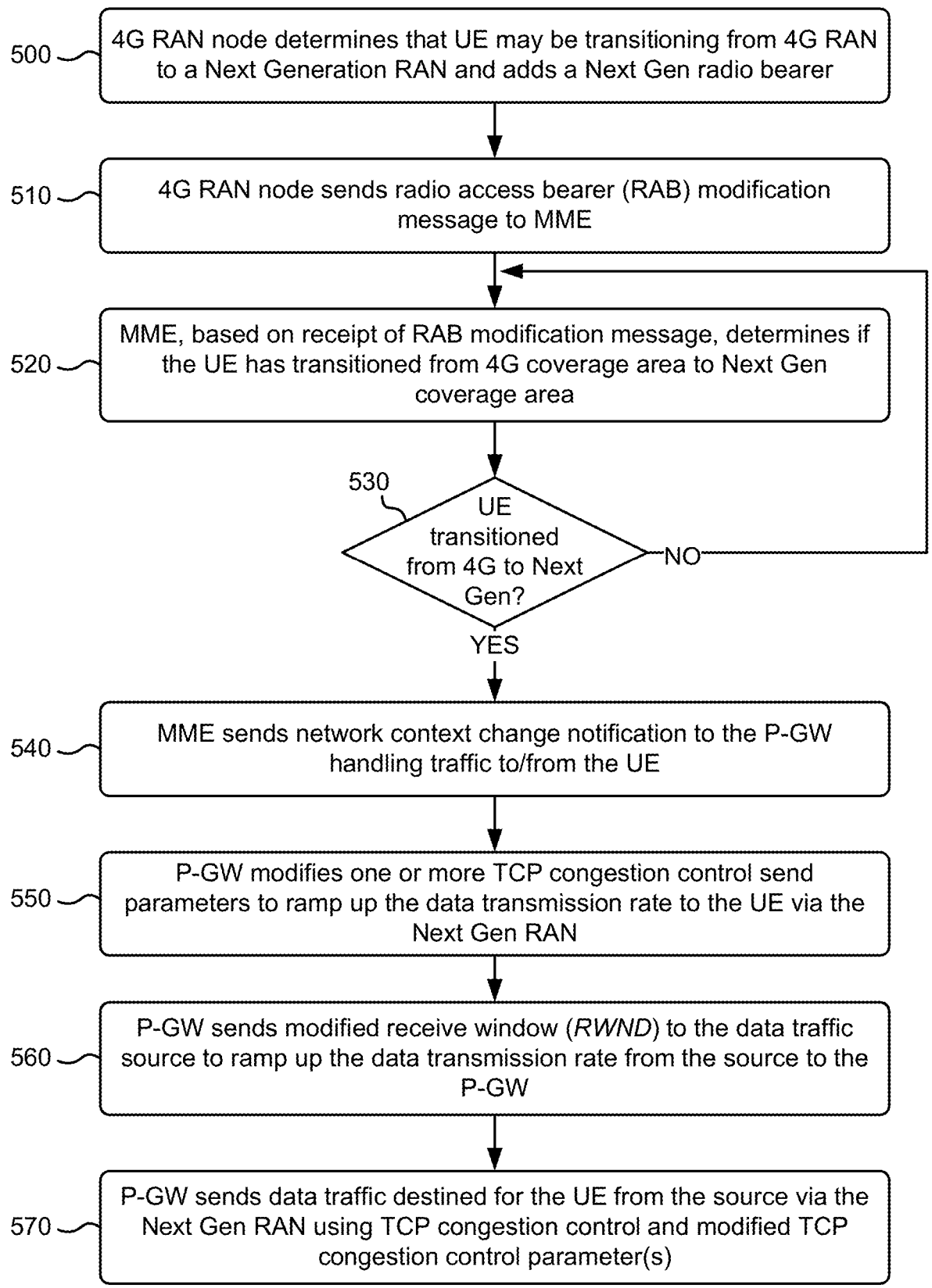
FIG. 5 is a flow diagram that illustrates an exemplary process for optimizing TCP congestion control parameters based on notification of a network context change as a user equipment moves from a first Radio Access Network to a second Radio Access Network of FIG. 1A.
Figure 6:
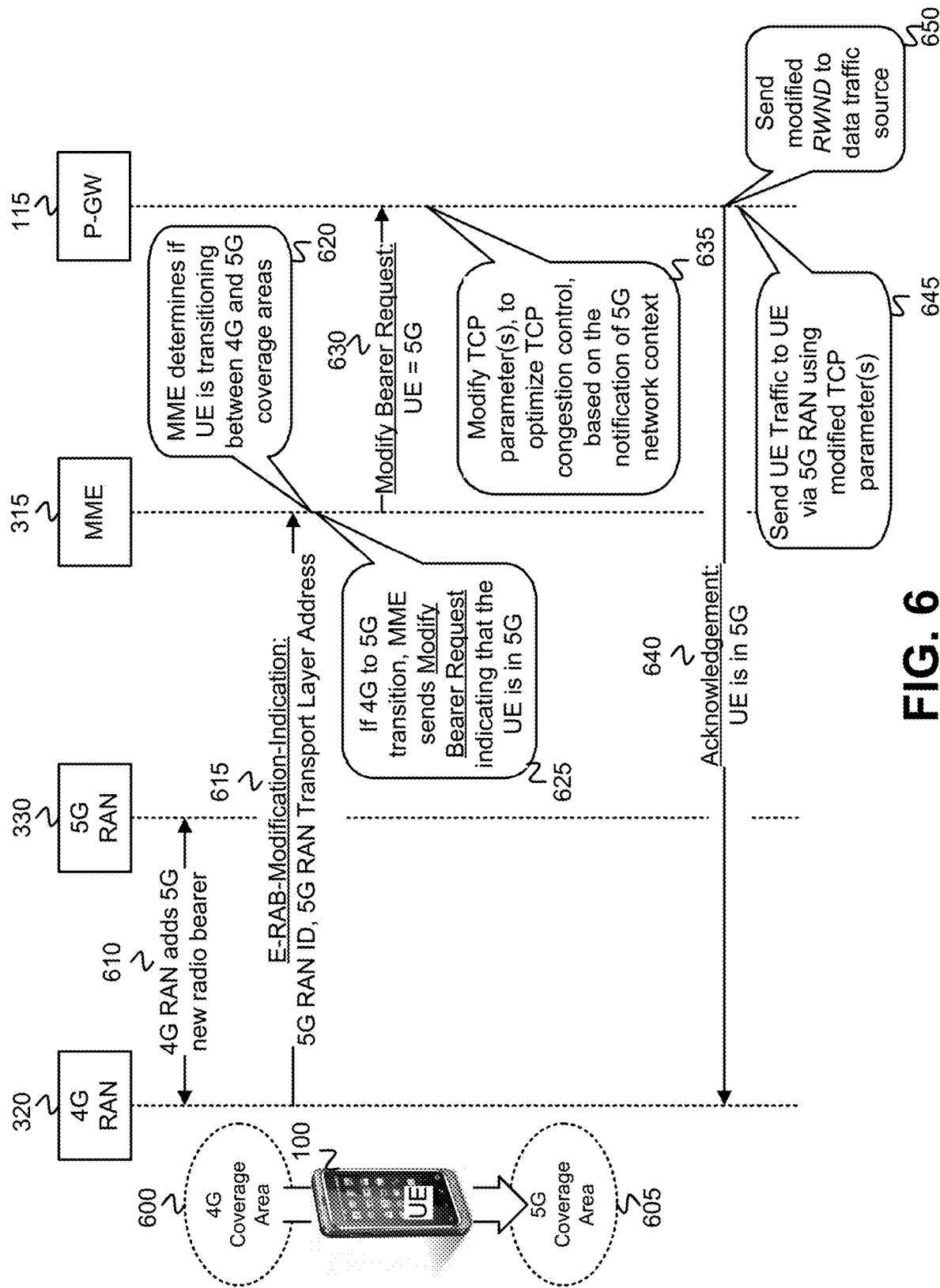
FIG. 6 is a messaging diagram associated with the exemplary process of FIG. 5.

FIG. 5 is a flow diagram that illustrates an exemplary process for optimizing TCP congestion control parameters based on notification of a network context change as a UE 100 moves from a first RAN to a second RAN. The first RAN and the second RAN may exhibit significantly different performance characteristics (e.g., different bandwidth). The exemplary process of FIG. 5 may be implemented by components of 4G mobile network 205, including 4G RAN 320, MME 315, and P-GW 115. The exemplary process of FIG. 5 is described below with reference to the messaging diagram of FIG. 6 and the throughput vs. time diagram of FIG. 7. The messaging diagram of FIG. 6 depicts a specific example in which Next Generation RAN 330 is a 5G RAN and is labeled as "5G RAN 330."

The exemplary process includes a 4G RAN node determining that UE 100 may be transitioning from 4G RAN 320 of 4G mobile network 205 to Next Generation RAN 330 of Next Generation mobile network 210 and adding a Next Generation radio bearer (block 500). The 4G RAN may include, for example, a BBU 325 or RRH of 4G RAN 320. UE 100 may move from a radio coverage area provided by the RRHs of 4G RAN 320 to a radio coverage area provided by the RRHs of Next Generation RAN 330. Addition of the Next Generation radio bearer may enable the rerouting of an ongoing data session with the UE 100 through a tunnel between P-GW 115 and the RAN 330 of the Next Generation mobile network 210. FIG. 6 depicts an example of UE 100 transiting from a 4G coverage area 600 to a 5G coverage area 605 and 4G RAN 320 deciding to add, at 610, a 5G new radio bearer.

The 4G RAN node sends a radio access bearer (RAB) modification message to MME 315 (block 510). In one implementation, the RAB modification message may include a Next Generation RAN identifier (ID) and a Next Generation RAN transport layer address of the Next Generation RAN 330 of the Next Generation mobile network 210 to which UE 100 is determined to be transiting. FIG. 6 shows 4G RAN 320 sending an E-RAB-Modification-Indication message 615 to MME 315 that includes the ID of the 5G RAN 330 to which UE 100 is transiting, and the transport layer address of the 5G RAN 330.

MME 315, based on receipt of the RAB modification message, determines if the UE 100 has transitioned from a radio coverage area associated with 4G RAN 320 to a radio coverage area associated with Next Generation RAN 330 (block 520). MME 315 may consult local configuration information to identify whether UE 100 has completed a transition from 4G RAN 320 to Next Generation RAN 330. FIG. 6 shows MME 315 determining, at 620, if UE 100 has transitioned from the coverage area 600 associated with the 4G RAN 320 to the coverage area 605 associated with the 5G RAN 330.

If MME 315 determines that UE 100 has not transitioned to the coverage area of Next Generation RAN 330 (NO—block 530), then MME 315 may repeat blocks 520 and 530 until the UE transition has occurred. If UE 100 has transitioned from 4G RAN 320 to Next Generation RAN 330 (YES—block 530), then MME 315 sends a network context change notification to the P-GW 115 handling traffic to/from the UE 100 (block 540). The network context change notification may identify the current network (e.g., 4G mobile network or Next Generation mobile network) to which UE 100 has transitioned and which is now providing UE 100 radio service. Though not shown, MME 315 may send the context change notification to P-GW 115 via a Serving Gateway (S-GW) of 4G mobile network 205 which, in turn, sends the context change notification to P-GW 115. FIG. 6 depicts MME 315 sending, if UE 100 has transitioned, at 625, from the 4G coverage area 600 to the 5G coverage area 605, a Modify Bearer Request message 630 that indicates the current 5G network context of UE 100.

P-GW 115 modifies one or more TCP congestion control send parameters to ramp up the data transmission rate to the UE 100 via the Next Generation RAN 330 (block 550). In some implementations, P-GW 115 may modify the TCP slow start and/or congestion window (CWND) parameters to ramp up the rate of transmission of data (i.e., quickly increase the data throughput) sent from P-GW 115 to the UE 100 via the Next Generation RAN 330. P-GW 115 may modify the one or more TCP congestion control send parameters responsive to receipt of the network context change notification. The slow start phase of the TCP congestion control algorithm may be represented by the following pseudocode:

```
if CWND <= ssthresh then
    each time an ACK is received:
        CWND = CWND + segsize
``` where: CWND is the current congestion window size;
ssthresh is the current slow start threshold;
ACK is an acknowledgement message received from the receiving device by the sender in response to the sender sending a block of data; and
segsize is a current value for the maximum segment size (i.e., a number of data bytes) that is used to increment the size of CWND when an ACK is received.
P-GW 115 may modify the CWND parameter by increasing the value of segsize such that the CWND increments by the increased segsize value (i.e., CWND=CWND+segsize), thereby increasing the rate at which CWND increases during the slow start phase of TCP congestion control. P-GW 115 may additionally, or alternatively, modify the ssthresh parameter by increasing its value such that the slow start phase, during which data is transmitted at a faster rate than during the congestion avoidance phase, lasts a longer period of time. Alternatively, P-GW 115 may tune the CWND parameter and the ssthresh parameter to operate together to aggressively increase the rate at which packets are transmitted when the UE 100 transmits from 4G RAN 320 to Next Generation RAN 330. For example, P-GW 115 may significantly increase the value of segsize, while simultaneously decreasing ssthresh such that CWND increments at a much faster rate over a shorter period of time.

The congestion avoidance phase of the TCP congestion control algorithm may further be represented by the following pseudocode:

```
if CWND > ssthresh then
    each time an ACK is received:
        CWND = CWND + segsize*segsize/CWND
```

IF P-GW 115 modifies the CWND parameter by increasing the value of segsize, then CWND, during the congestion avoidance phase, also increments by some percentage of the increased segsize value (i.e., CWND+segsize*segsize/CWND), thereby increasing the rate at which CWND increases (albeit at a much slower rate than during the slow start phase) during the congestion avoidance phase of TCP congestion control. P-GW 115 may additionally, or alternatively, modify the ssthresh parameter by increasing its value, as described above, such that the slow start phase lasts longer and the congestion avoidance phase occurs later, such that data is transmitted at a faster rate during the slow start phase before entering the congestion avoidance phase. P-GW 115 may additionally, or alternatively, modify the receive window size (RWND) associated with transport of a data stream between the data source (e.g., device 160) and P-GW 115. For example, P-GW 115 may increase the receive window size to increase the transmission rate on the data stream between the data source and P-GW 115. FIG. 6 shows an example of P-GW 115 modifying, at 635, TCP congestion control parameters, such as, for example, slow start, r CWND, and/or RWND parameters, to optimize the TCP congestion control algorithm. These modifications may be performed based on receipt of the Modify Bearer Request message 630 from MME 315 indicating a change of network context to the 5G network.

P-GW 115 sends the modified receive window size RWND to the data traffic source to ramp up the data transmission rate from the source to P-GW 115 (block 560). Block 560 may be optionally executed if P-GW 115 modifies TCP receive parameters in addition to, or instead of, modifying the TCP send parameters (e.g., CWND, ssthresh). FIG. 6 shows P-GW 115 sending, at 650, a modified RWND to the data traffic source (e.g., device 160).

P-GW 115 sends data destined for the UE 100 via the Next Generation RAN 330 using TCP congestion control and the one or more modified TCP congestion control parameters (block 570). P-GW 115 may additionally send an acknowledgement message to the 4G RAN 320 confirming that UE 100 has moved into the Next Generation mobile network coverage area. P-GW 115 may, for example, implement the TCP slow start phase, and congestion control avoidance phase, described above with respect to block 550, with modifications to the segsize and/or ssthresh values that, in turn, cause modifications to the current CWND value and to duration of the slow start phase. The modifications to the segsize and/or ssthresh values enable P-GW 115 to ramp up the transmission of data (i.e., rapidly increase the throughput) to the UE 100 when the UE 100 moves from 4G RAN 320 to Next Generation RAN 330. FIG. 6 depicts an example of P-GW 115 sending an acknowledgement message, at 640, acknowledging that UE 100 has changed network context to 5G, and then sending traffic, at 645, to UE 100 via the 5G RAN 330 using the modified TCP congestion control parameter(s).

Figure 7:
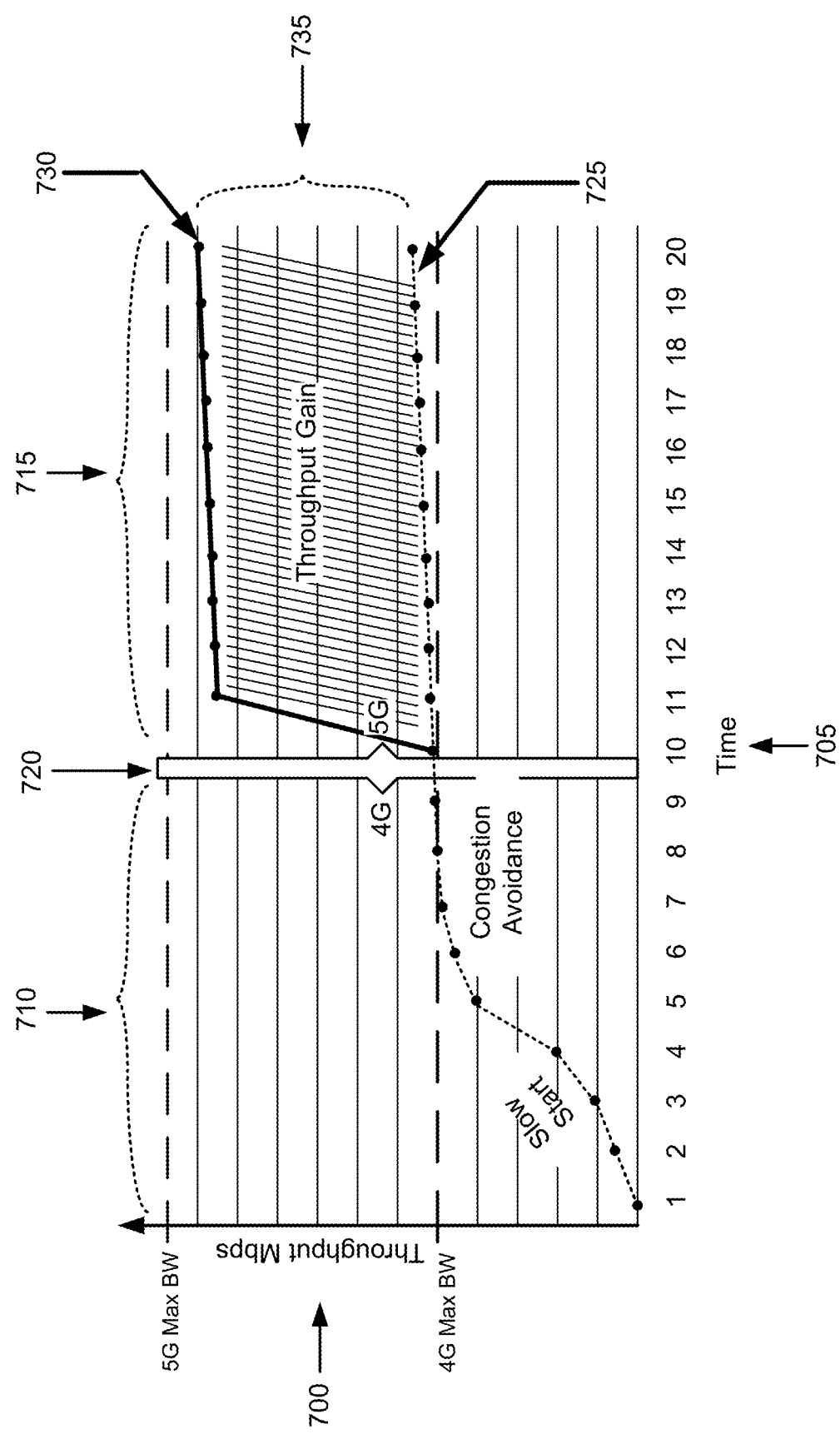
FIG. 7 is a throughput vs. time diagram associated with the exemplary process of FIG. 5.

FIG. 7 illustrates a graph of throughput vs. time that compares implementation of TCP congestion control using existing slow start and CWND parameters, and implementation of TCP congestion control using the slow start and/or CWND parameters as modified during block 550. As shown, the y-axis 700 represents throughput and the x-axis 705 represents time. The graph shows TCP congestion control being applied to the sending of traffic to UE 100 during a first period 710 during which UE 100 is present in 4G RAN 320, and during a subsequent, second period 715 during which UE 100 is present in 5G RAN 330. As can be seen comparing a first plot 725 showing TCP congestion control using unmodified slow start and CWND parameters, and a second plot 730 showing TCP congestion control using the modified slow start and CWND parameters, the modified, and more aggressive, slow start and CWND parameters produce a significant throughput gain 735 when a UE 100 transits from the 4G RAN 320 to the 5G RAN 330.

Figure 8:
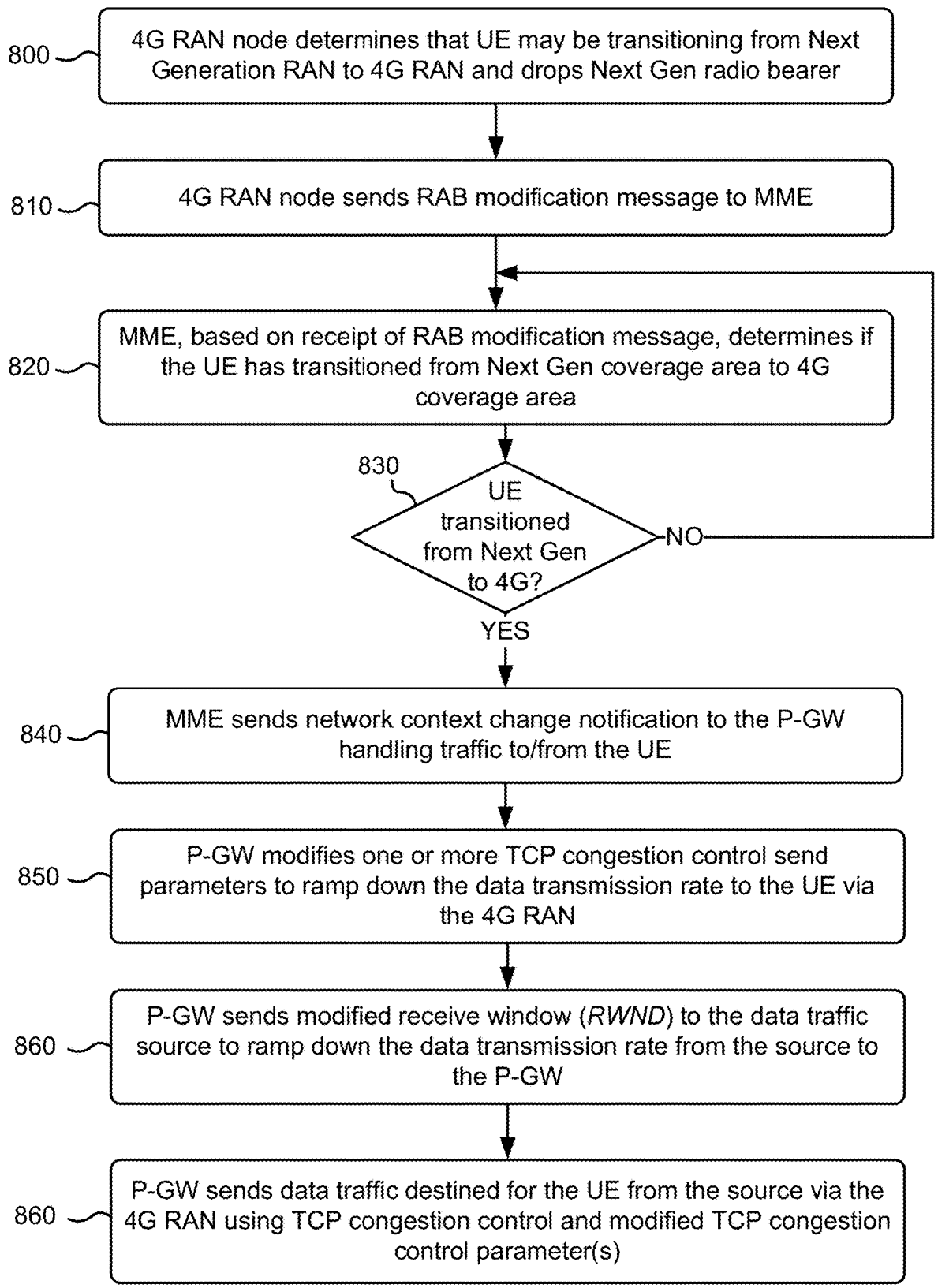
FIG. 8 is a flow diagram that illustrates an exemplary process for optimizing TCP congestion control parameters based on notification of a network context change as a user equipment moves from the second Radio Access Network to the first Radio Access Network of FIG. 1B.
Figure 9:
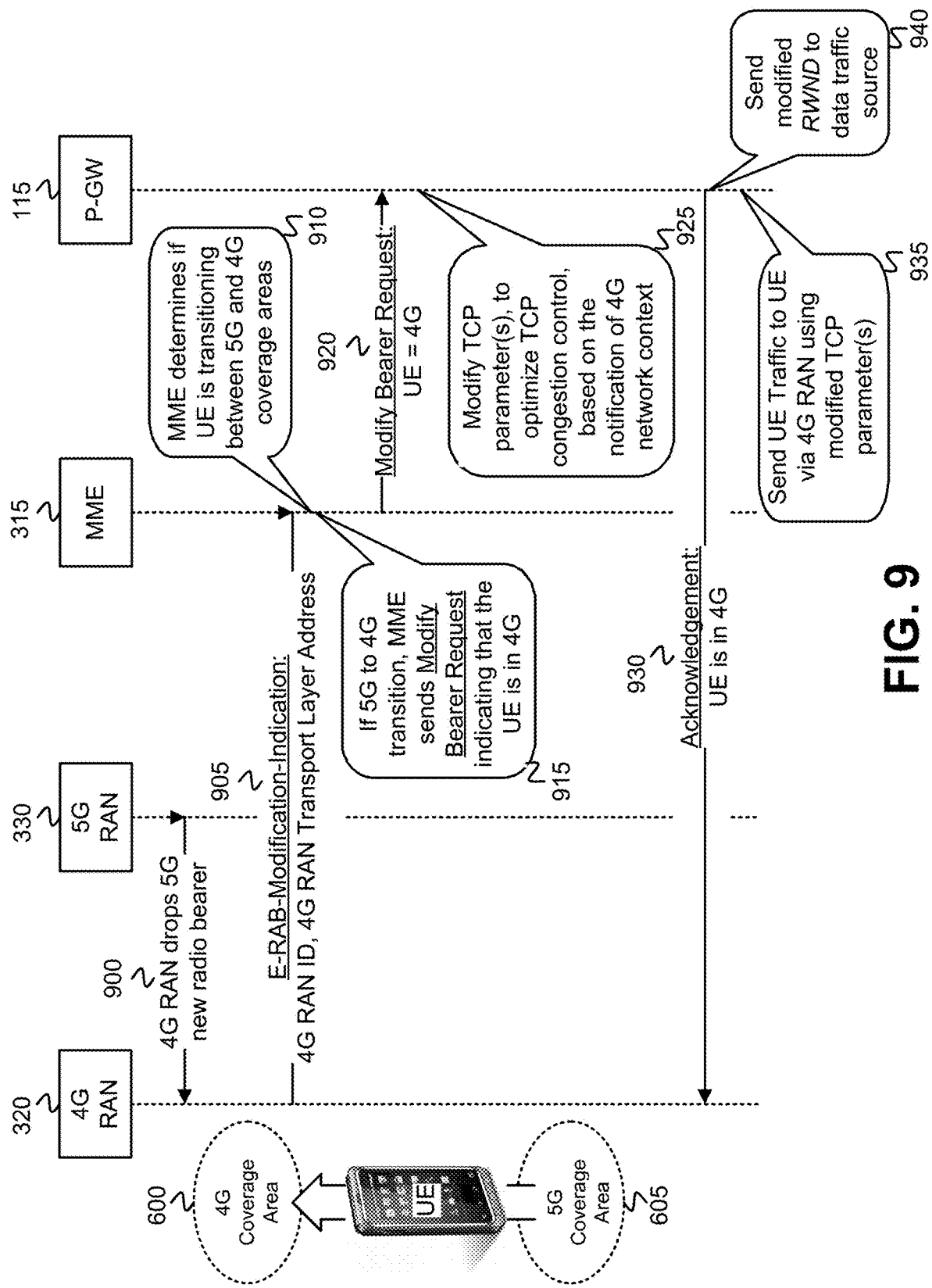
FIG. 9 is a messaging diagram associated with the exemplary process of FIG. 8.

FIG. 8 is a flow diagram that illustrates an exemplary process for optimizing TCP congestion control parameters based on notification of a network context change as a UE 100 moves from a second RAN to a first RAN. The first RAN and the second RAN may exhibit significantly different performance characteristics (e.g., different bandwidth). The exemplary process of FIG. 8 may be implemented by components of 4G mobile network 205, including 4G RAN 320, MME 315, and P-GW 115. The exemplary process of FIG. 8 is described below with reference to the messaging diagram of FIG. 9 and the throughput vs. time diagram of FIG. 10. The messaging diagram of FIG. 9 depicts a specific example in which Next Generation RAN 330 is a 5G RAN and is labeled as "5G RAN 330."

The exemplary process includes a 4G RAN node determining that UE 100 may be transitioning from a Next Generation RAN 330 of Next Generation mobile network 210 to a 4G RAN of 4G mobile network 205 and dropping the Next Generation radio bearer based on the determination (block 800). The 4G RAN node may include, for example, BBU 325 or an RRH of 4G RAN 320. UE 100 may move from a radio coverage area provided by the RRHs of 5G RAN 330 to a radio coverage area provided by the RRHs of Next Generation RAN 330. Dropping the previously created Next Generation radio bearer enables the rerouting of an ongoing data session with the UE 100 through the previously created tunnel (i.e., between P-GW 115 and Next Generation RAN 330) to 4G RAN 320 via 4G mobile network 205. FIG. 9 depicts an example of UE 100 transitioning from a 5G coverage area 600 to a 4G coverage area 600, and 4G RAN 320 dropping, at 900, the previously added 5G new radio bearer (i.e., added in block 500 of FIG. 5).

The 4G RAN node sends a radio access bearer (RAB) modification message to MME 315 (block 810). In one implementation, the RAB modification message may include a 4G RAN identifier (ID) and a 4G RAN transport layer address of the 4G RAN 320 of the 4G mobile network 205 to which UE 100 is determined to be transiting. FIG. 9 shows 4G RAN 320 sending an E-RAB-Modification-Indication message 905 to MME 315 that includes the ID of the 4G RAN 320 to which UE 100 is transiting, and the transport layer address of the 4G RAN 320.

MME 315, based on receipt of the RAB modification message, determines if the UE 100 has transitioned from a radio coverage area associated with 5G RAN 330 to a radio coverage area associated with 4G RAN 320 (block 820). MME 315 may consult local configuration information to identify whether UE 100 has completed a transition from 5G RAN 330 to 4G RAN 320. FIG. 9 shows MME 315 determining, at 910, if UE 100 has transitioned from the coverage area 605 associated with the 5G RAN 330 to the coverage area 600 associated with the 4G RAN 320.

If MME 315 determines that UE 100 has not transitioned to the coverage area of 4G RAN 320 (NO—block 830), then MME 315 may repeat blocks 820 and 830 until the UE transition has occurred. If UE 100 has transitioned from 5G RAN 330 to 4G RAN 320 (YES—block 830), then MME 315 sends a network context change notification to the P-GW 115 handling traffic to/from the UE 100 (block 840). The network context change notification may identify the current network (e.g., 4G mobile network or Next Generation mobile network) to which UE 100 has transitioned and which is now providing UE 100 radio service. Though not shown, MME 315 may send the context change notification to P-GW 115 via a S-GW of 4G mobile network 205 which, in turn, sends the context change notification to P-GW 115. FIG. 9 depicts MME 315 sending, if UE 100 has transitioned, at 915, from the 5G coverage area 605 to the 4G coverage area 600, a Modify Bearer Request message 920 that indicates the current 4G network context of UE 100.

P-GW 115 modifies one or more TCP congestion control parameters to ramp down the data transmission rate to the UE 100 via the 4G RAN 320 (block 850). In some implementations, P-GW 115 may modify the TCP slow start and/or congestion window (CWND) parameters to ramp down the rate of transmission of data sent to the UE 100 via the 4G RAN 320. P-GW 115 may modify the one or more TCP congestion control parameters responsive to receipt of the network context change notification. During UE movement between Next Generation RAN 330 and 4G RAN 320, the slow start phase of the TCP congestion control algorithm may be represented by the following pseudocode:

```
if CWND <= ssthresh then
    each time an ACK is received:
        CWND = CWND - segsize
``` where: CWND is the current congestion window size;
ssthresh is the current slow start threshold;
ACK is an acknowledgement message received from the receiving device in response to the sender sending a block of data; and
segsize is a current value for the maximum segment size that is used to decrement the size of CWND when an ACK is received.

P-GW 115 may modify the CWND parameter by increasing the value of segsize such that CWND decrements by the increased segsize value (i.e., CWND=CWND−segsize), thereby increasing the rate at which CWND decreases in size during the slow start phase of TCP congestion control. P-GW 115 may additionally, or alternatively, modify the ssthresh parameter by increasing its value such that the slow start phase lasts a longer period of time. Alternatively, P-GW 115 may tune the CWND parameter and the ssthresh parameter to operate together to aggressively decrease the rate at which packets are transmitted when the UE 100 transmits from Next Generation RAN 330 to 4G RAN 320. For example, P-GW 115 may significantly increase the value of segsize, while simultaneously decreasing ssthresh such that the size of CWND decrements at a much faster rate over a shorter period of time.

The congestion avoidance phase of the TCP congestion control algorithm may further be represented by the following pseudocode:

```
if CWND > ssthresh then
    each time an ACK is received:
        CWND = CWND - segsize*segsize/CWND
```

IF P-GW 115 modifies the CWND parameter by increasing the value of segsize, then CWND, during the congestion avoidance phase, also decrements by some percentage of the increased segsize value (i.e., CWND−segsize*segsize/CWND), thereby increasing the rate at which CWND decreases (albeit at a much slower rate of decrease than during the slow start phase) during the congestion avoidance phase of TCP congestion control. P-GW 115 may additionally, or alternatively, modify the ssthresh parameter by increasing its value, as described above, such that the slow start phase lasts longer and the congestion avoidance phase occurs later. P-GW 115 may additionally, or alternatively, modify the receive window size (RWND) associated with transport of a data stream between the data source (e.g., device 160) and P-GW 115. For example, P-GW 115 may decrease the receive window size to decrease the transmission rate on the data stream between the data source and P-GW 115. FIG. 9 shows an example of P-GW 115 modifying, at 925, TCP congestion control parameters, such as, for example, slow start, CWND and/or RWNDparameters, to optimize the TCP congestion control algorithm. These modifications may be performed based on receipt of the Modify Bearer Request message 920 from MME 315 indicating a change of network context to the 4G P-GW 115 sends the modified receive window size RWND to the data traffic source to ramp down the data transmission rate from the source to P-GW 115 (block 860). Block 860 may be optionally executed if P-GW 115 modifies TCP receive parameters in addition to, or instead of, modifying the TCP send parameters (e.g., CWND, ssthresh). FIG. 9 shows P-GW 115 sending, at 940, a modified RWND to the data traffic source (e.g., device 160).

P-GW 115 sends data destined for the UE 100 via the 4G RAN 320 using TCP congestion control and the one or more TCP congestion control parameters (block 860). P-GW 115 may additionally send an acknowledgement message to the 4G RAN 320 confirming that UE 100 has moved into the 4G mobile network coverage area. P-GW 115 may, for example, implement the TCP slow start phase, and congestion control avoidance phase, described above with respect to block 850, with modifications to the segsize and/or ssthresh values that, in turn, cause modifications to the current CWND value and to duration of the slow start phase. The modifications to the segsize and/or ssthresh values enable P-GW 115 to ramp down the rate of transmission of data (i.e., quickly decreasing throughput) to the UE 100 when the UE 100 moves from Next Generation RAN 330 to 4G RAN 320. FIG. 9 depicts an example of P-GW 115 sending an acknowledgement message 930 acknowledging that UE 100 has changed network context to 4G, and then sending, at 935, traffic to UE 100 via the 4G RAN 320 using the modified TCP slow start and/or CWND parameters.

Figure 10:
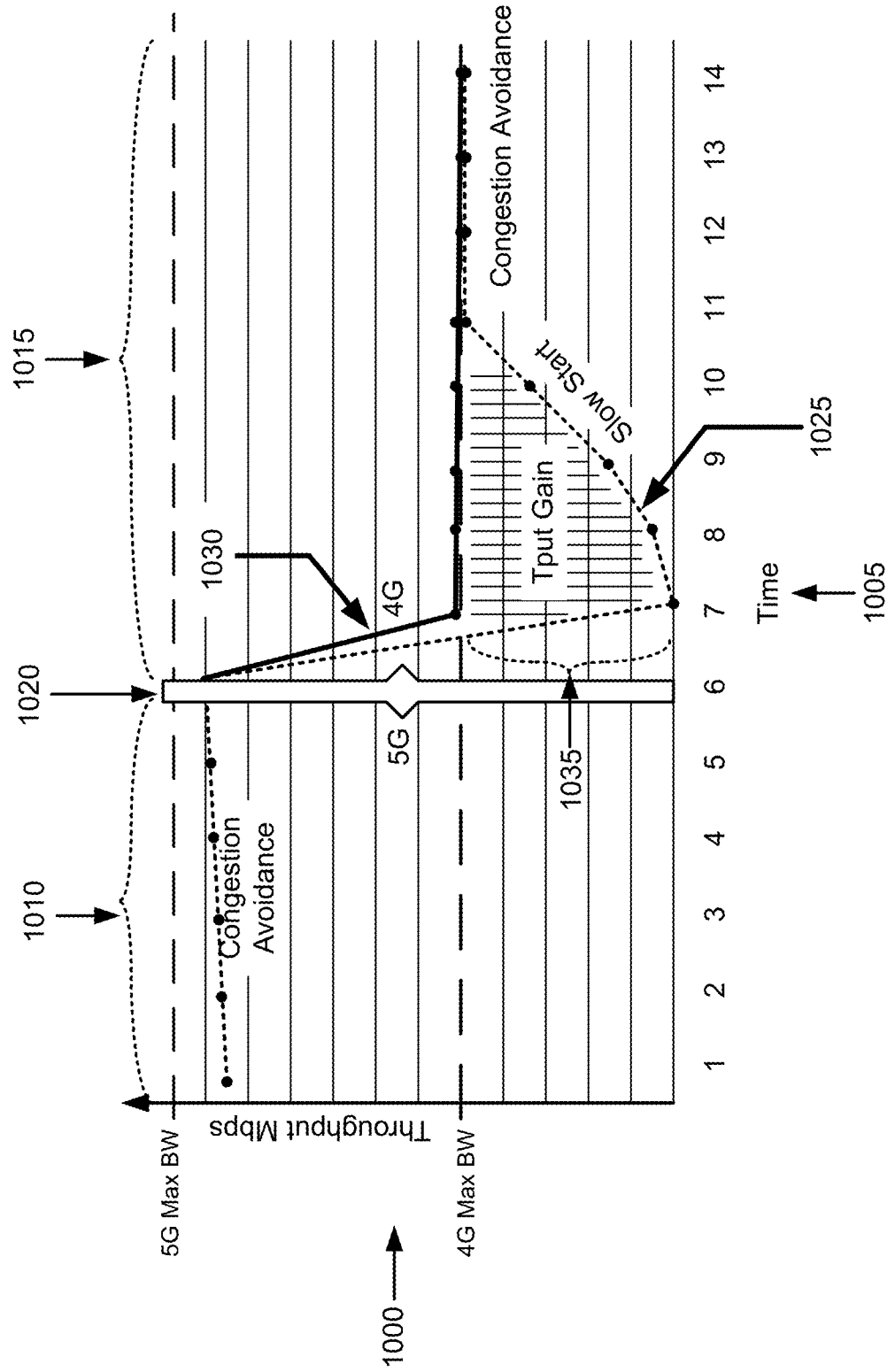
FIG. 10 is a throughput vs. time diagram associated with the exemplary process of FIG. 8.

FIG. 10 illustrates a graph of throughput vs. time that compares implementation of TCP congestion control, using existing slow start and CWND parameters, and implementation of TCP congestion control using the slow start and/or CWND parameters modified during block 850. As shown, the y-axis 1000 represents throughput and the x-axis 1005 represents time. The graph shows TCP congestion control being applied to the sending of traffic to UE 100 during a first period 1010 during which UE 100 is present in Next Generation RAN 330, and during a subsequent, second period 1015 during which UE 100 is present in 4G RAN 320. As can be seen comparing a first plot 1025 showing TCP congestion control using unmodified slow start and CWND parameters, and a second plot 1030 showing TCP congestion control using the modified slow start and CWND parameters, the modified slow start and CWND parameters produce a significant throughput gain 1035 when a UE 100 transits from the Next Generation RAN 330 to the 4G RAN 320.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5 and 8 and sequences of operations, messages, and data flows with respect to FIGS. 1A, 1B, 6 and 9, the order of the blocks, the operations, messages, and/or data flows may be varied in other implementations. Additionally, though, embodiments described herein relate to data transport on a download between a data source (e.g., device 160) and a destination (e.g., UE 100), the techniques described herein with respect to modifying send and/or receive TCP congestion control parameters based on a change in network context may also be applied on the upload between a UE 100 and a destination device (e.g., device 160, or other device). In such embodiments, the modified receive window size RWND may be sent between P-GW 115 and UE 100, and the modified TCP congestion control parameters (e.g., congestion window size CWND and/or slow start threshold ssthresh) may be used by the TCP proxy at P-GW 115 to send data between P-GW 115 and the destination device (e.g., device 160, or other device). Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    transmitting, from a sending device, data to a user equipment (UE) via a first Radio Access Network (RAN) using first Transmission Control Protocol (TCP) congestion control parameters;
    receiving, by the sending device, a notification message indicating that the UE has moved from the first RAN to a second RAN;
    modifying, by the sending device responsive to receipt of the notification, the first TCP congestion control parameters to create second TCP congestion control parameters; and
    transmitting, from the sending device, data to the UE via the second RAN using the second TCP congestion control parameters,
    wherein the first RAN comprises a Fourth Generation (4G) RAN, the second RAN comprises a Next Generation RAN, the first TCP congestion control parameters include a first congestion window size (CWND), and the second TCP congestion control parameters include a second CWND that is greater than the first CWND, or
    wherein the first RAN comprises a Next Generation RAN, the second RAN comprises a 4G RAN, the first TCP congestion control parameters include a third CWND, and the second TCP congestion control parameters include a fourth CWND that is less than the third CWND.

2. The method of claim 1, wherein the first TCP congestion control parameters include a first slow start threshold (ssthresh) and wherein the second TCP congestion control parameters include a second ssthresh that is different than the first ssthresh.

3. The method of claim 2, wherein the first ssthresh and the second ssthresh each define a congestion window size threshold during which data is transmitted at a higher rate.

4. The method of claim 1, wherein, when the first RAN comprises the 4G RAN and the second RAN comprises the Next Generation RAN, the first TCP congestion control parameters include a first slow start threshold (ssthresh) and the second TCP congestion control parameters include a second ssthresh that is greater than the first ssthresh.

5. The method of claim 1, wherein, when the first RAN comprises the Next Generation RAN and the second RAN comprises the 4G RAN, the first TCP congestion control parameters include a first slow start threshold (ssthresh) and wherein the second TCP congestion control parameters include a second ssthresh that is less than the first ssthresh.

6. A network device, comprising:
    at least one communication interface to:
        transmit data to a user equipment (UE) via a first Radio Access Network (RAN) using first Transmission Control Protocol (TCP) congestion control parameters, and
        receive a notification message indicating that the UE has moved from the first RAN to a second RAN; and
    a processor, or logic, that modifies, responsive to receipt of the notification, the first TCP congestion control parameters to create second TCP congestion control parameters,
    wherein the at least one communication interface further transmits data to the UE via the second RAN using the second TCP congestion control parameters,
        wherein the first RAN comprises a Fourth Generation (4G) RAN, the second RAN comprises a Next Generation RAN, the first TCP congestion control parameters include a first congestion window size (CWND), and the second TCP congestion control parameters include a second CWND that is greater than the first CWND, or
        wherein the first RAN comprises a Next Generation RAN, the second RAN comprises a 4G RAN, the first TCP congestion control parameters include a third CWND, and the second TCP congestion control parameters include a fourth CWND that is less than the third CWND.

7. The network device of claim 6, wherein the first TCP congestion control parameters include a first slow start threshold (ssthresh) and wherein the second TCP congestion control parameters include a second ssthresh that is different than the first ssthresh.

8. The network device of claim 6, wherein, when the first RAN comprises the 4G RAN and the second RAN comprises the Next Generation RAN, the first TCP congestion control parameters include a first slow start threshold (ssthresh) and the second TCP congestion control parameters include a second ssthresh that is greater than the first ssthresh.

9. The network device of claim 6, wherein, when the first RAN comprises the Next Generation RAN and the second RAN comprises the 4G RAN, the first TCP congestion control parameters include a first slow start threshold (ssthresh) and wherein the second TCP congestion control parameters include a second ssthresh that is less than the first ssthresh.

10. A non-transitory storage medium storing instructions executable by a network device with one or more processors, wherein execution of the instructions cause the network device to:
    transmit data to a user equipment (UE) via a first Radio Access Network (RAN) using first Transmission Control Protocol (TCP) congestion control parameters;
    receive a notification message indicating that the UE has moved from the first RAN to a second RAN;

modify, responsive to receipt of the notification, the first TCP congestion control parameters to create second TCP congestion control parameters; and transmit data to the UE via the second RAN using the second TCP congestion control parameters, wherein the first RAN comprises a Fourth Generation (4G) RAN, the second RAN comprises a Next Generation RAN, the first TCP congestion control parameters include a first congestion window size (CWND), and the second TCP congestion control parameters include a second CWND that is greater than the first CWND, or wherein the first RAN comprises a Next Generation RAN, the second RAN comprises a 4G RAN, the first TCP congestion control parameters include a third CWND, and the second TCP congestion control parameters include a fourth CWND that is less than the third CWND.

11. The non-transitory storage medium of claim 10, wherein the first TCP congestion control parameters include a first slow start threshold (ssthresh) and wherein the second TCP congestion control parameters include a second ssthresh that is different than the first ssthresh.

12. The non-transitory storage medium of claim 11, wherein the first ssthresh and the second ssthresh each define a congestion window size threshold during which data is transmitted at a higher rate.

13. The non-transitory storage medium of claim 10, wherein, when the first RAN comprises the 4G RAN and the second RAN comprises the Next Generation RAN, the first TCP congestion control parameters include a first slow start threshold (ssthresh) and the second TCP congestion control parameters include a second ssthresh that is greater than the first ssthresh.

14. The non-transitory storage medium of claim 10, wherein, when the first RAN comprises the Next Generation RAN and the second RAN comprises the 4G RAN, the first TCP congestion control parameters include a first slow start threshold (ssthresh) and wherein the second TCP congestion control parameters include a second ssthresh that is less than the first ssthresh.

* * * * *